United States Patent
Heims et al.

(10) Patent No.: US 10,897,846 B2
(45) Date of Patent: Jan. 26, 2021

(54) CORN HARVESTER

(71) Applicant: Deere & Company, Moline, IL (US)

(72) Inventors: Troy M. Heims, Davenport, IA (US); Nathan E. Krehbiel, Bettendorf, IA (US); Steve A. Coon, Long Grove, IA (US); Dennis P. Silver, Viola, IL (US); Eric D. Windsor, Eldridge, IA (US); Eric H. Stone, Port Byron, IL (US)

(73) Assignee: DEERE & COMPANY, Moline, IL (US)

( * ) Notice: Subject to any disclaimer, the term of this patent is extended or adjusted under 35 U.S.C. 154(b) by 196 days.

(21) Appl. No.: 16/177,088

(22) Filed: Oct. 31, 2018

(65) Prior Publication Data

US 2020/0128747 A1  Apr. 30, 2020

(51) Int. Cl.
*A01D 65/04* (2006.01)
*A01D 45/02* (2006.01)
*A01D 41/14* (2006.01)
*A01B 73/04* (2006.01)

(52) U.S. Cl.
CPC .......... *A01D 65/04* (2013.01); *A01D 41/144* (2013.01); *A01D 45/021* (2013.01); *A01B 73/044* (2013.01)

(58) Field of Classification Search
CPC ...... A01D 45/021; A01D 63/04; A01D 63/00; A01D 65/04; A01D 41/144; A01D 45/02; A01D 57/22; A01B 73/044; A01B 63/008
See application file for complete search history.

(56) References Cited

U.S. PATENT DOCUMENTS 3,584,444 A * 6/1971 Sammann ............ A01D 45/021
56/119
3,646,737 A * 3/1972 Grant .................. A01D 45/021
56/106

(Continued)

FOREIGN PATENT DOCUMENTS

| CN | 206728617 U | 12/2017 | |
| DE | 3231953 A1 * | 3/1984 | ............ A01D 45/02 |
| DE | 102005036183 A1 | 2/2007 | |

OTHER PUBLICATIONS

Case IH Harvesting, "Header Tips," <https://caseihharvesting.com/header-tips> webpage accessed Aug. 13, 2018.

*Primary Examiner* — Arpad Fabian-Kovacs
(74) *Attorney, Agent, or Firm* — Michael Best & Friedrich LLP

(57) ABSTRACT

A harvester includes a main frame, first side frame, and a second side frame. The first and second side frames are rotatable about the main frame between a deployed position and a stowed position. A first crop divider is rotatable with respect to the first side frame to change an angle between the first crop divider and the ground. A first biasing member biases the first crop divider into the raised position. A second crop divider is rotatable with respect to the second side frame to change an angle between the second crop divider and the ground. A second biasing member biases the second crop divider into the raised position. During movement of the first and second side frames into the stowed position, the first and second crop dividers are moved into the lowered position against the biasing force of the respective biasing member.

20 Claims, 12 Drawing Sheets

(56) References Cited

U.S. PATENT DOCUMENTS

| | | | | |
|---|---|---|---|---|
| 3,967,439 | A * | 7/1976 | Mott | A01D 63/00 56/314 |
| 4,137,695 | A * | 2/1979 | Sammann | A01D 65/00 56/106 |
| 4,193,250 | A * | 3/1980 | Kessens | A01D 41/141 56/208 |
| 4,445,314 | A * | 5/1984 | Gust | A01D 41/147 56/119 |
| 5,444,968 | A * | 8/1995 | Barton | A01D 45/021 56/119 |
| 5,775,076 | A * | 7/1998 | Mossman | A01D 45/021 56/119 |
| 5,787,697 | A * | 8/1998 | Post | A01D 45/021 56/119 |
| 5,910,092 | A * | 6/1999 | Bennett | A01D 45/021 56/119 |
| 6,116,010 | A * | 9/2000 | Salley | A01D 34/17 56/257 |
| 6,513,313 | B1 * | 2/2003 | Bennett | A01D 45/021 56/119 |
| 7,240,471 | B2 * | 7/2007 | Mossman | A01D 45/021 56/109 |
| 7,395,651 | B2 * | 7/2008 | Kost | A01D 45/021 56/119 |
| 7,681,387 | B2 * | 3/2010 | Guldenpfennig | A01D 45/021 56/119 |
| 8,141,331 | B2 * | 3/2012 | Bich | A01D 63/04 56/15.2 |
| 8,863,487 | B2 * | 10/2014 | Calmer | A01D 45/021 56/106 |
| 9,173,345 | B2 * | 11/2015 | Cressoni | A01D 45/021 |
| 9,253,944 | B2 * | 2/2016 | Hulstein | A01D 41/06 |
| 9,603,304 | B2 * | 3/2017 | Lambertini | A01D 45/021 |
| 2002/0035826 | A1 * | 3/2002 | Albinger | A01D 41/144 56/109 |
| 2004/0231309 | A1 * | 11/2004 | Rickert | A01D 63/02 56/119 |
| 2008/0155954 | A1 * | 7/2008 | Schlipf | A01D 41/141 56/10.2 E |
| 2012/0291410 | A1 * | 11/2012 | Silver | A01D 45/021 56/119 |
| 2014/0260165 | A1 * | 9/2014 | Lohrentz | A01D 63/00 56/119 |
| 2016/0007531 | A1 * | 1/2016 | Schlipf | A01D 41/141 56/10.2 E |
| 2017/0000026 | A1 * | 1/2017 | Seki | A01D 45/10 |
| 2018/0184592 | A1 * | 7/2018 | Lehman | A01D 45/021 |
| 2019/0045710 | A1 * | 2/2019 | Benes | A01D 43/081 |
| 2019/0230841 | A1 * | 8/2019 | Walker | A01B 63/008 |

* cited by examiner

CORN HARVESTER

BACKGROUND

The present disclosure relates to harvesters and specifically to corn harvesters.

SUMMARY

In one embodiment, the disclosure provides a harvester configured to travel along a ground surface to harvest crops. The harvester includes a main frame portion having a first main frame end and a second main frame end. A first side frame portion includes a first end rotatably coupled to the first main frame end, and a second end spaced from the first end. The first side frame is rotatable about the main frame between a deployed position in which the first side frame is positioned adjacent the ground surface and the first main frame end, and a stowed position in which the first side frame is positioned vertically above the first main frame and is spaced from the ground surface. A first crop divider is coupled to the second end of the first side frame portion. The first crop divider is rotatable between a raised position in which the first crop divider is oriented at a first angle with respect to the ground surface while the first side frame portion is in the deployed position, and a lowered position in which the first crop divider is oriented at a second angle with respect to the ground surface while the first side frame portion is in the deployed position. The first angle is greater than the second angle. A first biasing member is configured to bias the first crop divider into the raised position. A second side frame portion includes a first end rotatably coupled to the main frame portion at the second main frame end, and a second end spaced from the first end. The second side frame is rotatable about the main frame end between a deployed position in which the second side frame is positioned adjacent the ground surface and the second main frame end, and a stowed position in which the first side frame is positioned vertically above the main frame and is spaced from the ground surface. A second crop divider is coupled to the second end of the second side frame portion. The second crop divider is rotatable between a raised position in which the second crop divider is oriented at a third angle with respect to the ground surface while the second side frame portion is in the deployed position and a lowered position in which the second crop divider is oriented at a fourth angle with respect to the ground surface while the second side frame portion is in the deployed position. The third angle is greater than the fourth angle. A second biasing member is configured to bias the second crop divider into the raised position. During movement of the first side frame portion into the stowed position, the first crop divider is moved into the lowered position against the biasing force of the first biasing member, and during movement of the second side frame portion into the stowed position, the second crop divider is moved into the lowered position against the biasing force of the second biasing member.

In another embodiment the disclosure provides a harvester including a frame configured to travel along a ground surface. The frame includes a first end and a second end spaced from the first end. At least one crop engaging implement is coupled to the frame, and is configured to harvest crops as the main frame travels along the ground surface. A hopper is coupled to the frame and is configured to retain harvested crops. A first crop divider is coupled to the first end of the frame. The first crop divider is moveable between a raised position in which the first crop divider is oriented at a first angle with respect to the ground surface, and a lowered position in which the first crop divider is oriented at a second angle with respect to the ground surface. The first angle is greater than the second angle. A first biasing member is configured to bias the first crop divider into the raised position. A first rotary stalk lifter is coupled to the frame adjacent the first end and is configured to rotate to move harvested crops toward the hopper. A second crop divider is coupled to the second end of the frame. The second crop divider is moveable between a raised position in which the second crop divider is oriented at a third angle with respect to the ground surface, and a lowered position in which the second crop divider is oriented at a fourth angle with respect to the ground surface. The third angle is greater than the fourth angle. A second biasing member is configured to bias the second crop divider into the raised position. A second rotary stalk lifter is coupled to the frame adjacent the second end and is configured to rotate to move harvested crops toward the hopper.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
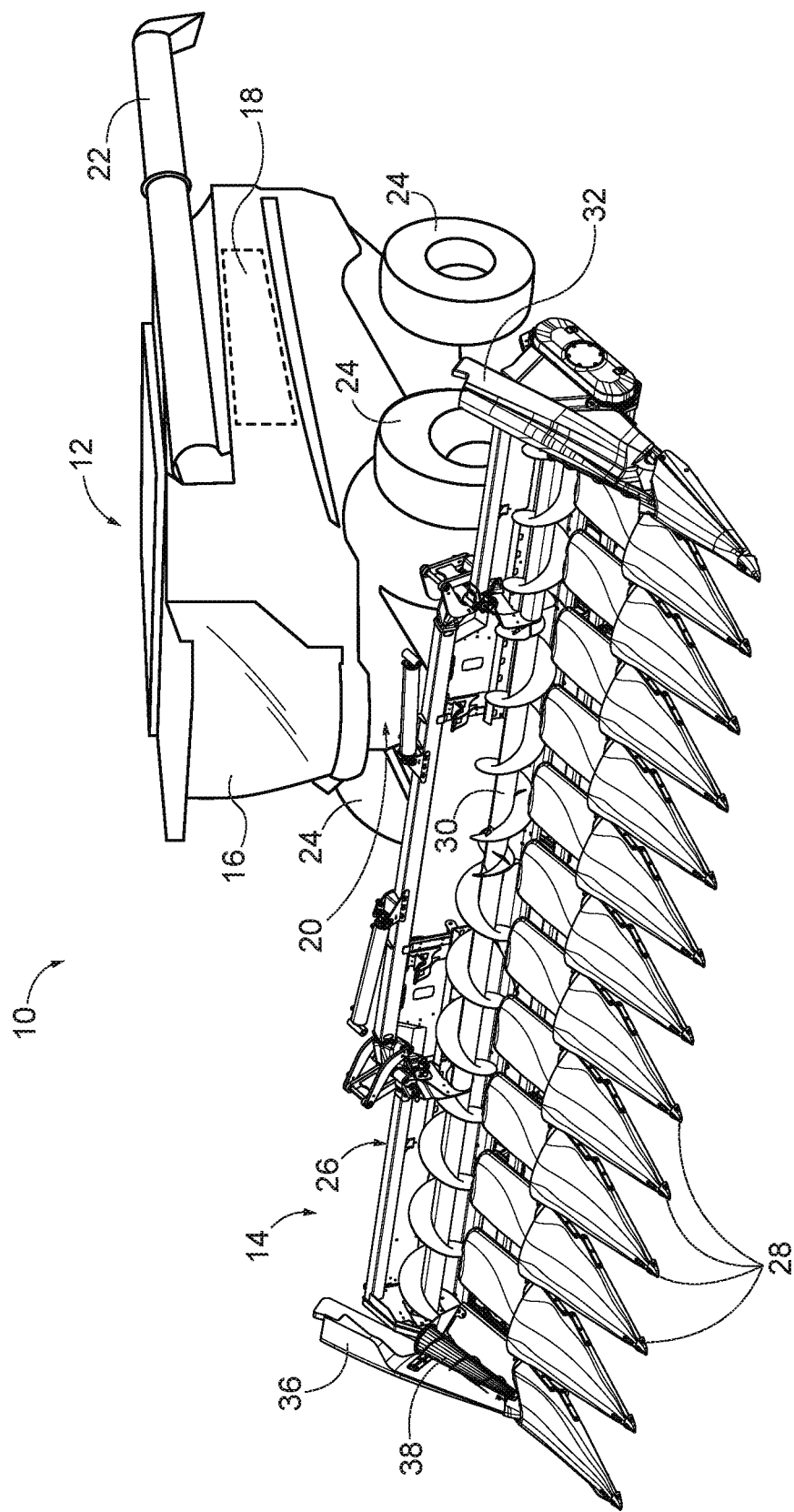
FIG. 1 is a perspective view of a corn harvester according to some embodiments of the present disclosure.

FIG. 1 illustrates a corn harvester 10 including a work vehicle 12 and a corn harvesting attachment 14. The illustrated work vehicle 12 includes an operator cab 16, an engine 18, a hopper 20, a dispensing chute 22, and a plurality of wheels 24. The engine 18 is configured to move the work vehicle 12 and the corn harvesting attachment 14 along a ground surface. The hopper 20 is configured to receive harvested crops from the harvesting attachment 14. The dispensing chute 22 is configured to dispense the harvested crops to a container, such as a wagon. Other work vehicles can include tracks in place of the plurality of wheels.

The illustrated corn harvesting attachment 14 includes a frame 26, a plurality of crop dividers 28, a cross auger 30, a first crop divider 32, a first rotary stalk lifter 34 (shown in FIG. 2), a second crop divider 36, and a second rotary stalk lifter 38. The corn harvesting attachment 14 engages the ground to harvest crops, such as corn. The crop dividers 28 are configured to separate and engage the crop to conveyor it further toward the cross auger 30. In some embodiments, the crop is corn and ears of corn are conveyed toward the cross auger 30. The cross auger 30 is configured to move harvested corn heads toward the hopper 20.

Figure 2:
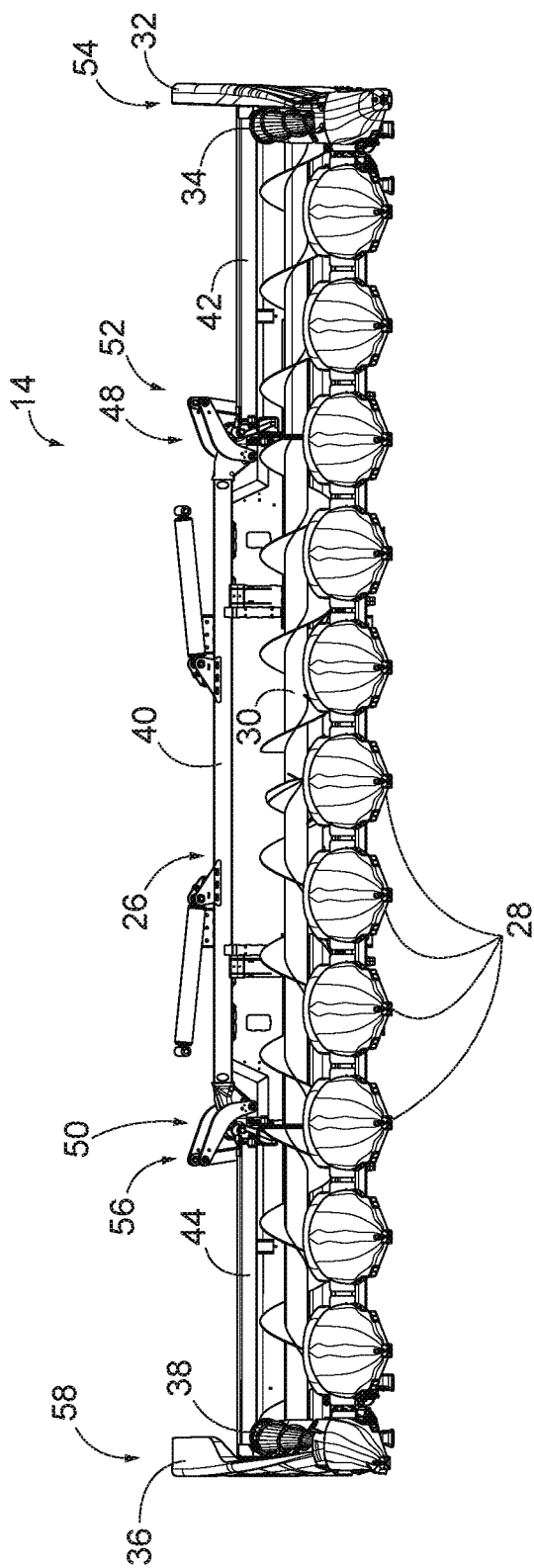
FIG. 2 is a front view of a corn head of the corn harvester of FIG. 1 in a deployed position.
Figure 3:
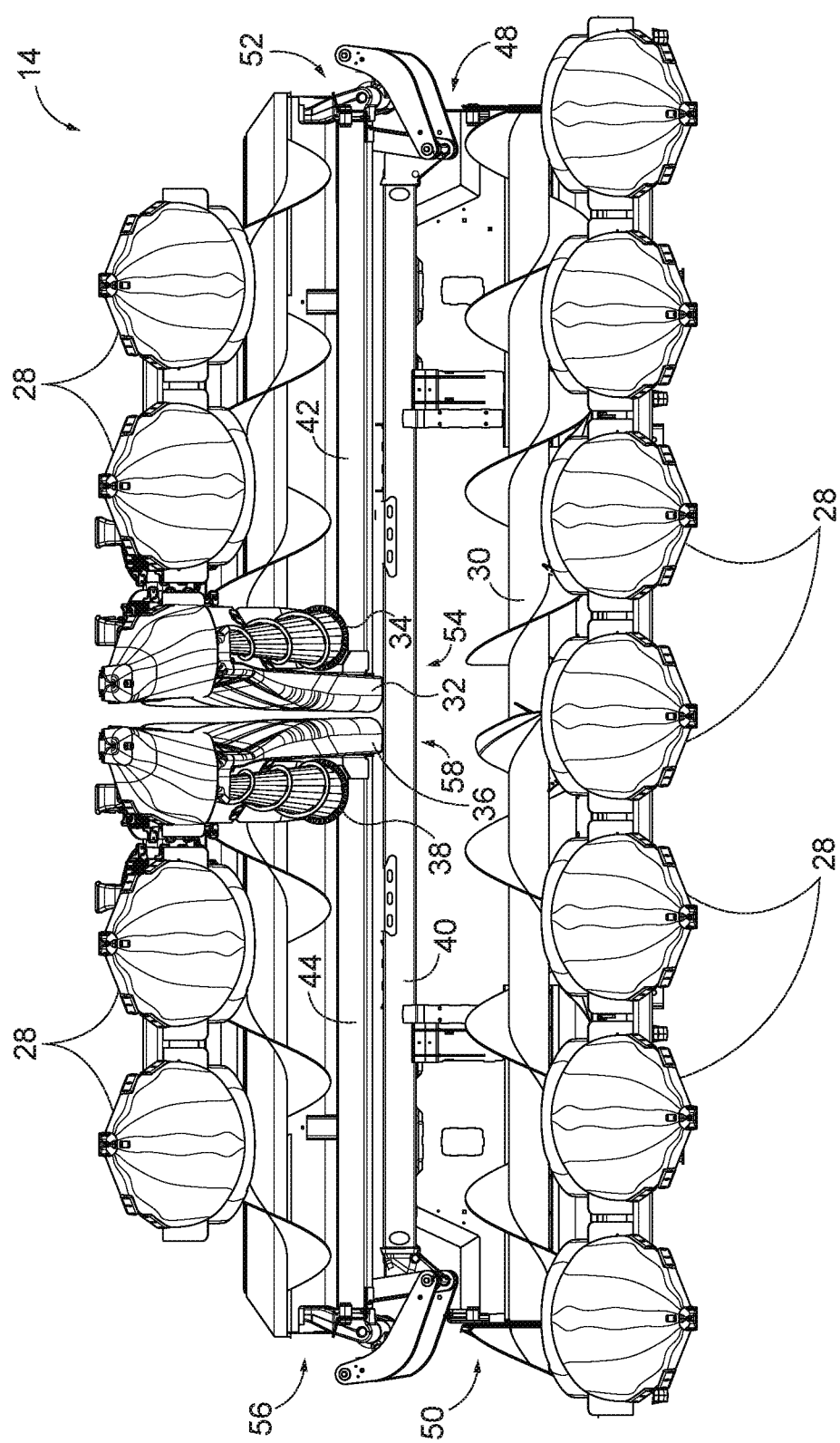
FIG. 3 is a front view of the corn head in a stowed position.

FIGS. 2 and 3 illustrate the frame 26 in greater detail. The frame 26 includes a main frame portion 40, a first side frame portion 42, and a second side frame portion 44. The main frame portion 40 has a first main frame end 48 and a second main frame end 50. The first side frame portion 42 includes a first end 52 coupled to the first main frame end 48 and a second end 54 spaced from the main frame portion 40. The second side frame portion 44 includes a first end 56 coupled to the second main frame end 50 and a second end 58 spaced from the main frame portion 40.

FIG. 2 illustrates the first side frame portion 42 and the second side frame portion 44 in the deployed position. In the deployed position, the first side frame portion 42 and the second side frame portion 44 are positioned adjacent a ground surface and are positioned alongside the main frame portion 40.

FIG. 3 illustrates the first side frame portion 42 and the second side frame portion 44 in the stowed position. In the stowed position, the first side frame portion 42 and the second side frame portion 44 are positioned vertically above (relative to the ground) the main frame portion 40 and are spaced from the ground surface. The first and second side frame portions 42, 44 are rotatable about the main frame portion 40 between the stowed and deployed positions.

As shown in FIGS. 2 and 3, the first crop divider 32 and the first rotary stalk lifter 34 are coupled to the second end 54 of the first side frame portion 42, and the second crop divider 36 and the second rotary crop lifter 38 are coupled to the second end 58 of the second side frame portion 44.

Figure 4:
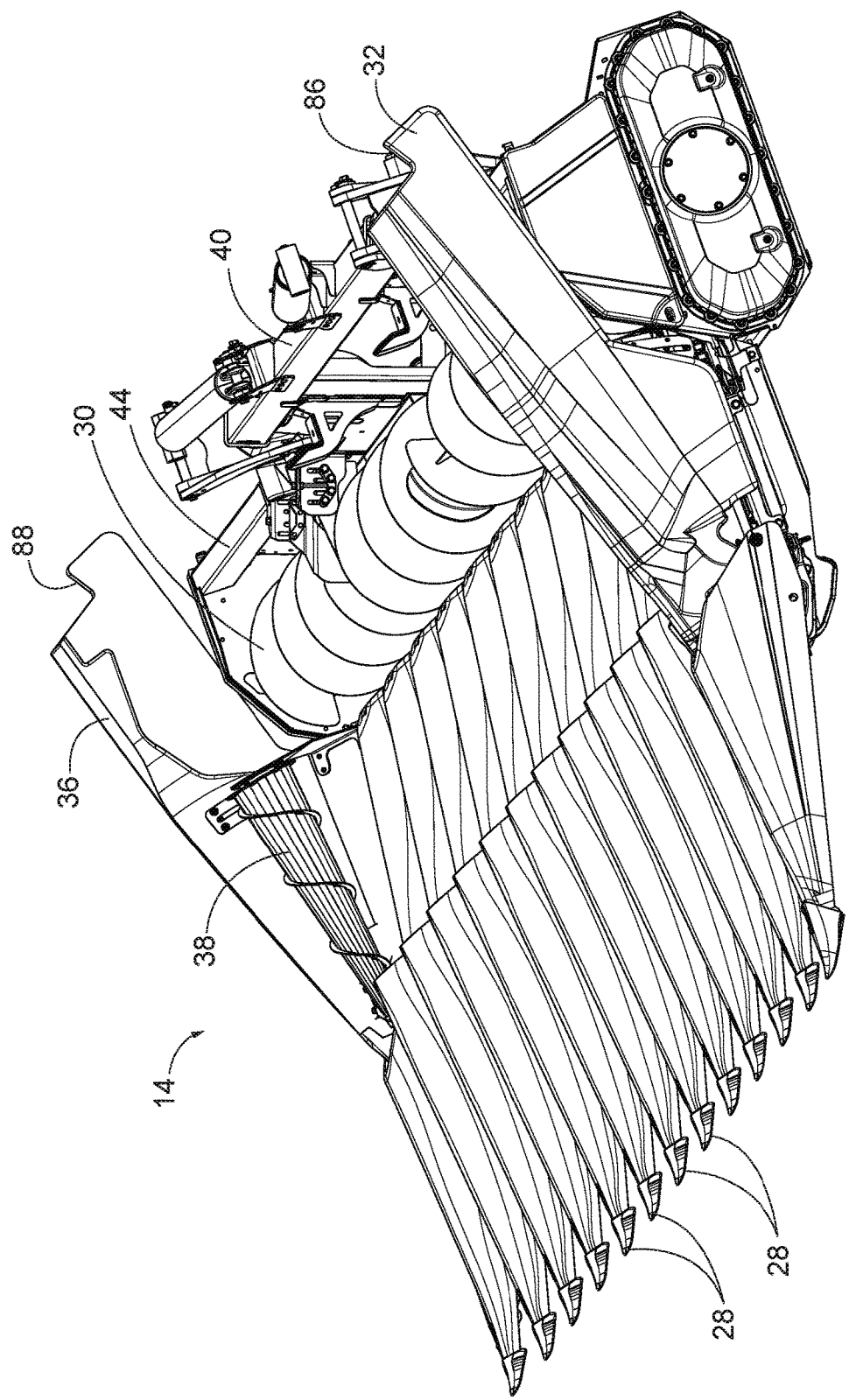
FIG. 4 is a perspective view of the corn head with crop dividers in a raised position.
Figure 5:
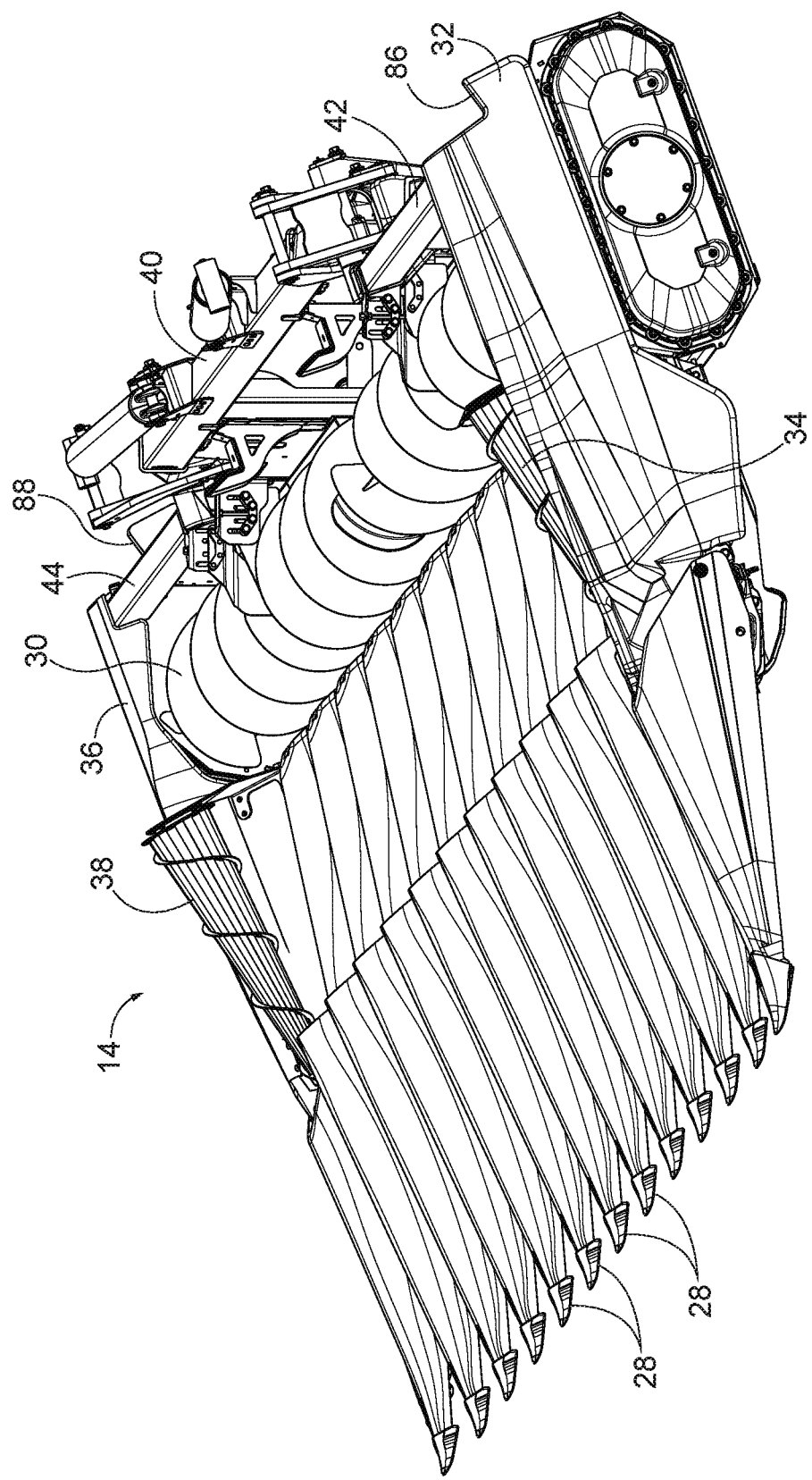
FIG. 5 is a perspective view of the corn head with crop dividers in a lowered position.
Figure 6:
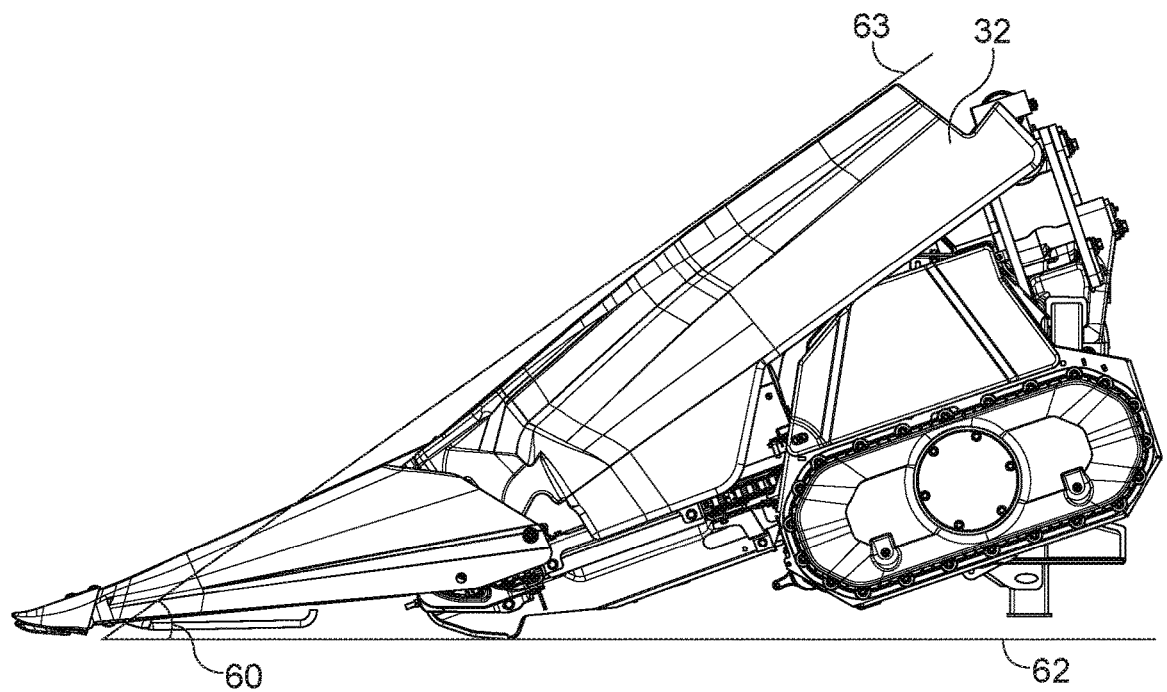
FIG. 6 is a right side view of the corn head with the crop dividers in the raised position.
Figure 7:
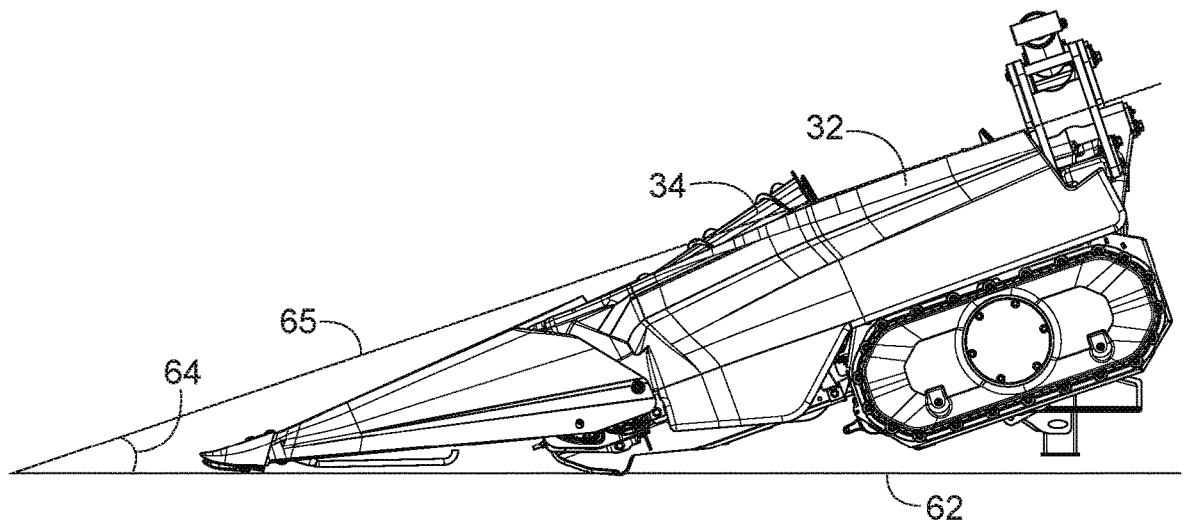
FIG. 7 is a right side view of the corn head with the crop dividers in the lowered position.

With reference to FIGS. 4-7, the first crop divider 32 is rotatable between a raised position (shown in FIGS. 4 and 6) and a lowered position (shown in FIGS. 5 and 7). As shown in FIG. 6, in the raised position, the first crop divider 32 is oriented at a first angle 60 with respect to a ground surface 62. A first tangent line 63 is drawn along a top edge of the first crop divider 32 when the first crop divider 32 is in the raised position. The first angle 60 is measured between the first tangent line 63 and the ground surface 62.

As shown in FIG. 7, in the lowered position, the first crop divider 32 is oriented at a second angle 64 with respect to the ground surface 62. A second tangent line 65 is drawn along a top edge of the first crop divider 32 when the first crop divider 32 is in the lowered position. The second angle 64 is measured between the second tangent line 65 and the ground surface. The first angle 60 is greater than the second angle 64. In some embodiments, the first angle 60 is between 5° and 45° greater than the second angle 64. In some embodiments, the first angle 60 is between 10° and 30° greater than the second angle 64. In some embodiments, the first angle 60 is between 15° and 20° greater than the second angle 64.

In the illustrated embodiment, the first rotary stalk lifter 34 is fixed to the first side frame portion 42, such that the first crop divider 32 moves with respect to the first side frame portion 42 and the first rotary stalk lifter 34. In the illustrated embodiment, while the first crop divider 32 is in the raised position, the first crop divider 32 extends vertically above the first rotary stalk lifter 34, see FIG. 6. In the raised position of FIG. 6, the first rotary stalk lifter 34 is not visible from the side because the first crop divider 32 extends vertically above a top of the first rotary stalk lifter 34. In the illustrated embodiment, while the first crop divider 32 is in the lowered position, a portion of the first rotary stalk lifter 34 extends vertically above a portion of the first crop divider 32, see FIG. 7. In the lowered position of FIG. 7, a portion of the first rotary stalk lifter 34 is visible above the first crop divider 32.

In other embodiments, the first rotary stalk lifter 34 is coupled to the first crop divider 32 for movement with the first crop divider 32 relative to the first side frame portion 42 between a raised position and a lowered position. The first rotary stalk lifter 34 is configured to rotate to move harvested crop toward the auger 30.

Figure 8:
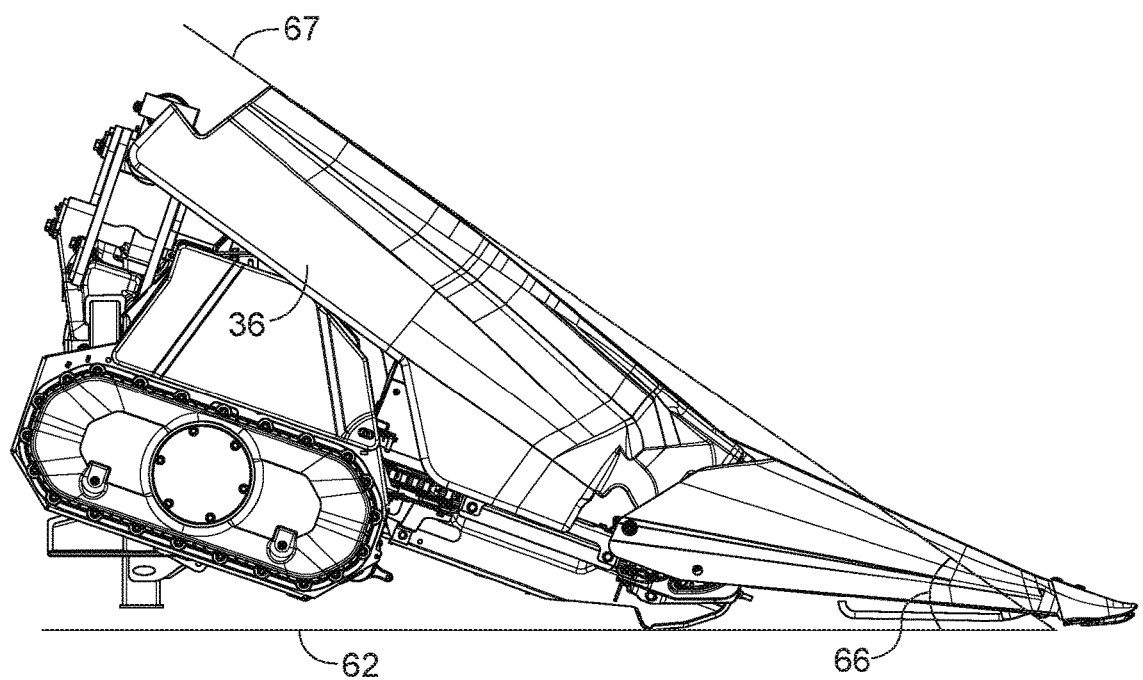
FIG. 8 is a left side view of the corn head with the crop dividers in the raised position.
Figure 9:
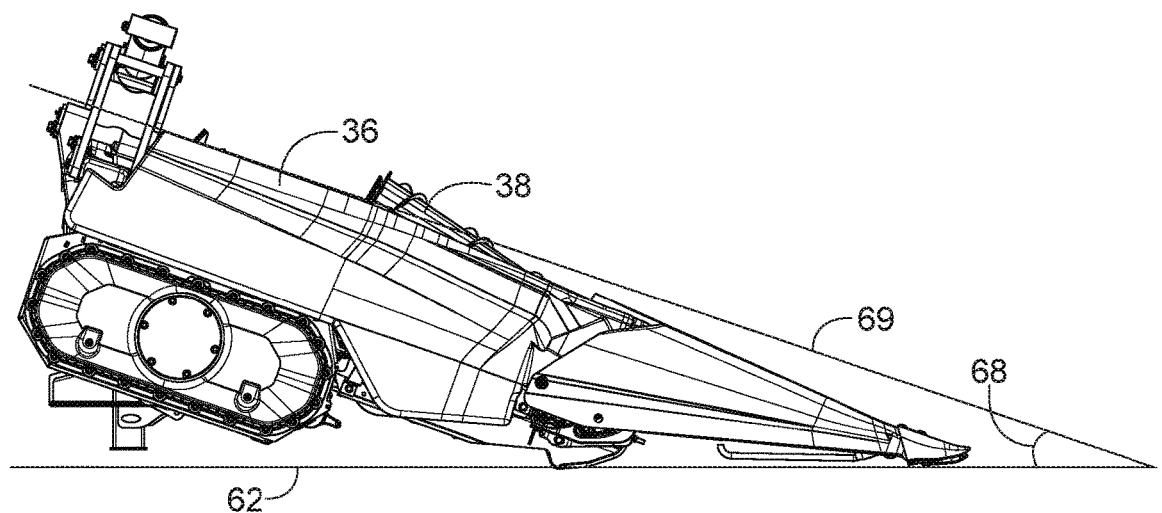
FIG. 9 is a left side view of the corn head with the crop dividers in the lowered position.

As shown in FIGS. 4, 5, 8 and 9, the second crop divider 36 is rotatable between a raised position (shown in FIGS. 4 and 8) and a lowered position (shown in FIGS. 5 and 9). The second crop divider 36 is substantially a mirror image of the first crop divider 32. As shown in FIG. 8, in the raised position, the second crop divider 36 is oriented at a third angle 66 with respect to the ground surface 62. A third tangent line 67 is drawn along a top edge of the second crop divider 36 when the second crop divider 36 is in the raised position. The third angle 66 is measured between the third tangent line 67 and the ground surface 62.

As shown in FIG. 9, in the lowered position, the second crop divider 36 is oriented at a fourth angle 68 with respect to the ground surface 62. A fourth tangent line 69 is drawn along a top edge of the second crop divider 36 when the second crop divider 36 is in the lowered position. The fourth angle 68 is measured between the fourth tangent line 69 and the ground surface 62. The third angle 66 is greater than the fourth angle 68. In some embodiments, the third angle 66 is between 5° and 45° greater than the fourth angle 68. In some embodiments, the third angle 66 is between 10° and 30° greater than the fourth angle 68. In some embodiments, the third angle 66 is between 15° and 20° greater than the fourth angle 68.

In the illustrated embodiment, the second rotary stalk lifter 38 is fixed to the second side frame portion 44, such that the second crop divider 36 moves with respect to the second side frame portion 44 and the second rotary stalk lifter 38. In the illustrated embodiment, while the second crop divider 36 is in the raised position, the second crop divider 36 extends vertically above the second rotary stalk lifter 38, see FIG. 8. In the raised position of FIG. 8, the second rotary stalk lifter 38 is not visible from the side because the second crop divider 36 extends vertically above a top of the second rotary stalk lifter 38. In the illustrated embodiment, while the second crop divider 36 is in the lowered position, a portion of the second rotary stalk lifter 38 extends vertically above a portion of the second crop divider 36, see FIG. 9. In the lowered position of FIG. 9, a portion of the second rotary stalk lifter 38 is visible above the second crop divider 36.

In some embodiments, the second rotary stalk lifter 38 is coupled to the second crop divider 36 for movement with the second crop divider 36 relative to the second side frame portion 44 between a raised and a lowered position. The second rotary stalk lifter 38 is configured to rotate to move harvested crop toward the auger 30.

Figure 10:
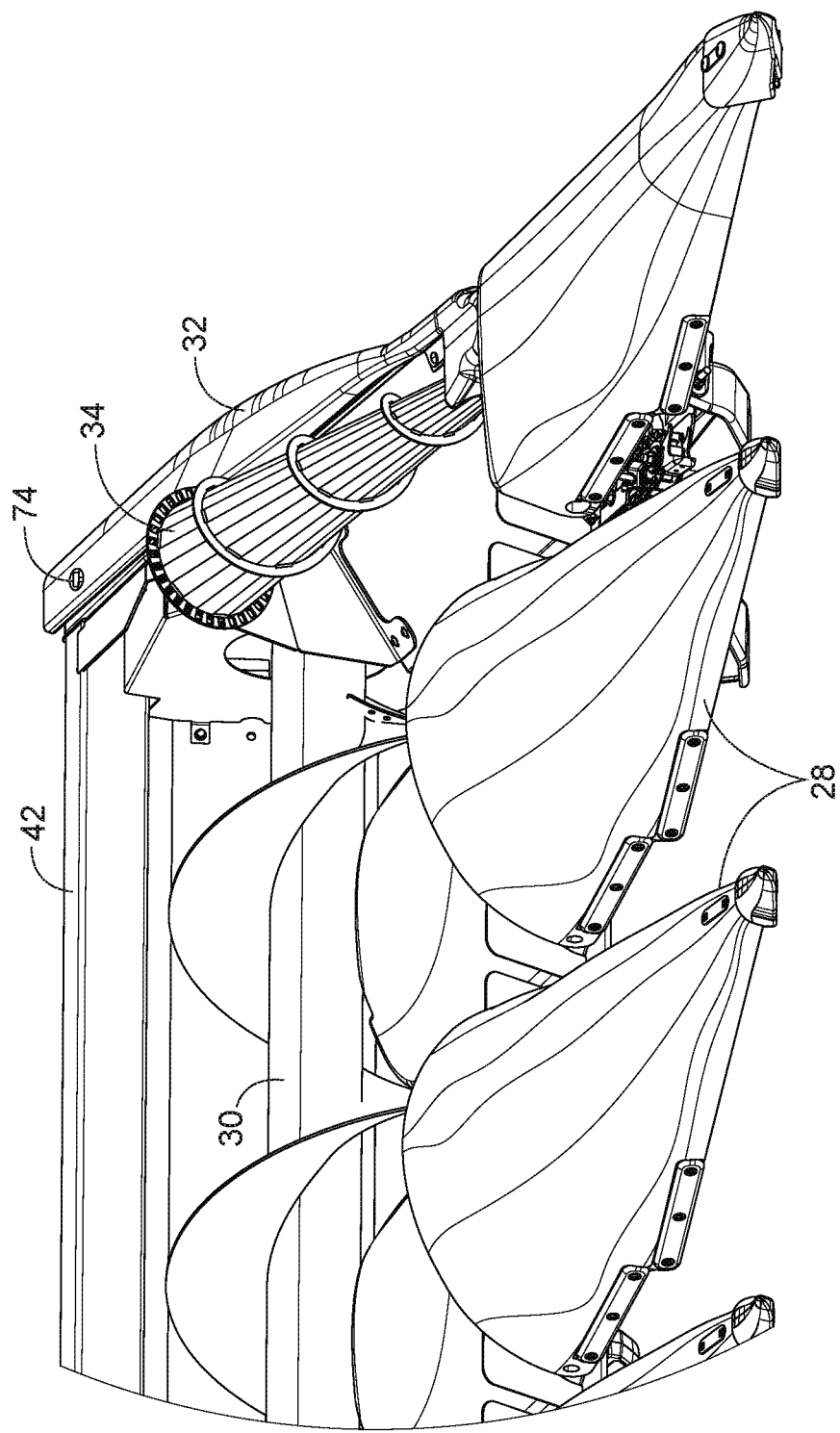
FIG. 10 is close up perspective view of a right side portion of the corn head with the crop divider in the lowered position.
Figure 11:
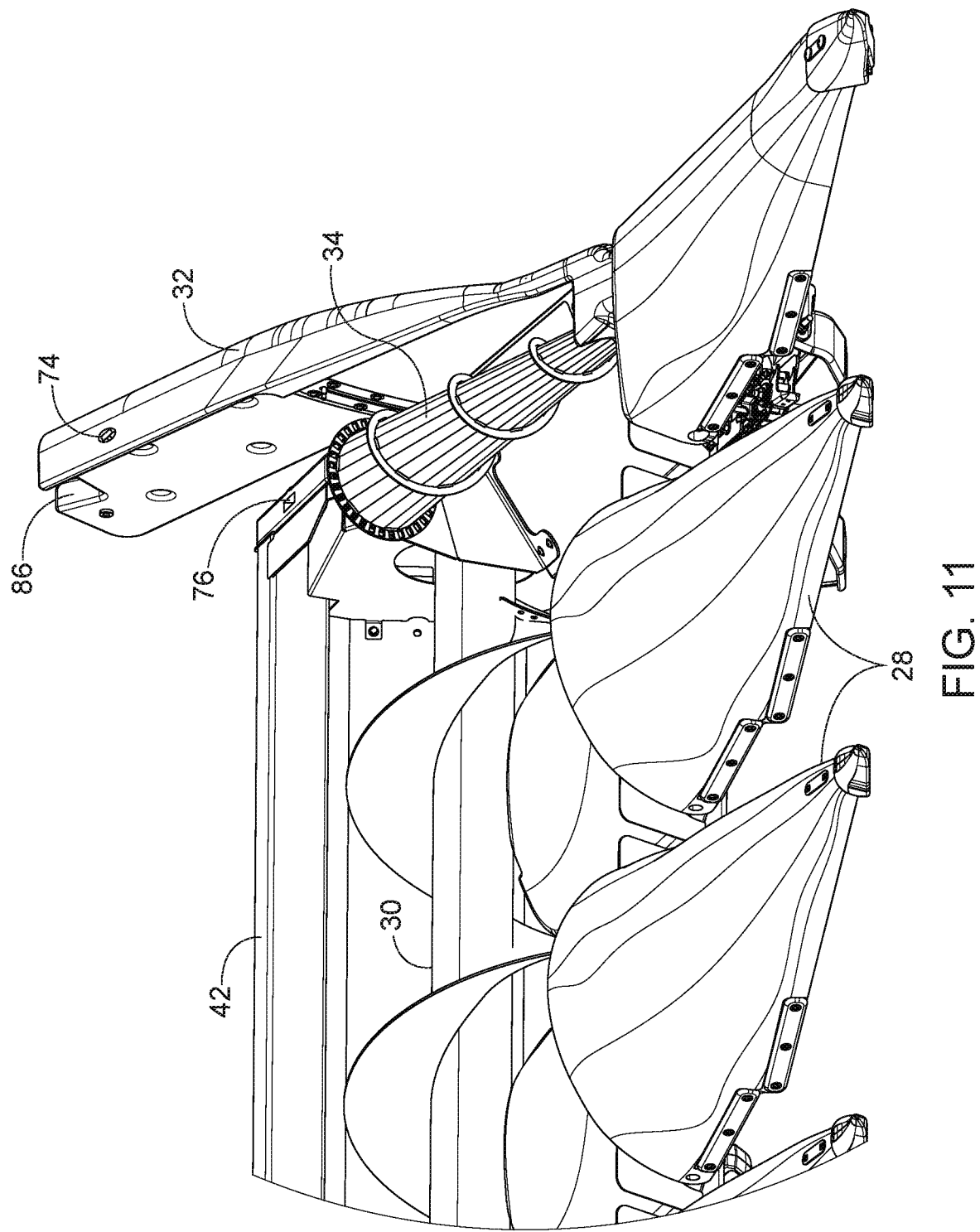
FIG. 11 is a close up perspective view of the right side portion of the corn head with the crop divider in the raised position.

With reference to FIGS. 10 and 11, a first retaining element 74 is configured to retain the first crop divider 32 in the lowered position while the first retaining element 74 engages the first side frame 42. The first side frame 42 includes a first slot 76. The first retaining element 74 can be inserted into the first slot 76 and rotated to engage the first side frame 42. FIG. 10 illustrates the first retaining element 74 in a locked position, such that the first crop divider 32 is retained in the lowered position. The first retaining element 74 can be unlocked to permit the first crop divider 32 to move with respect to the first frame portion 42. FIG. 11 illustrates the first crop divider 32 in the raised position.

Figure 12:
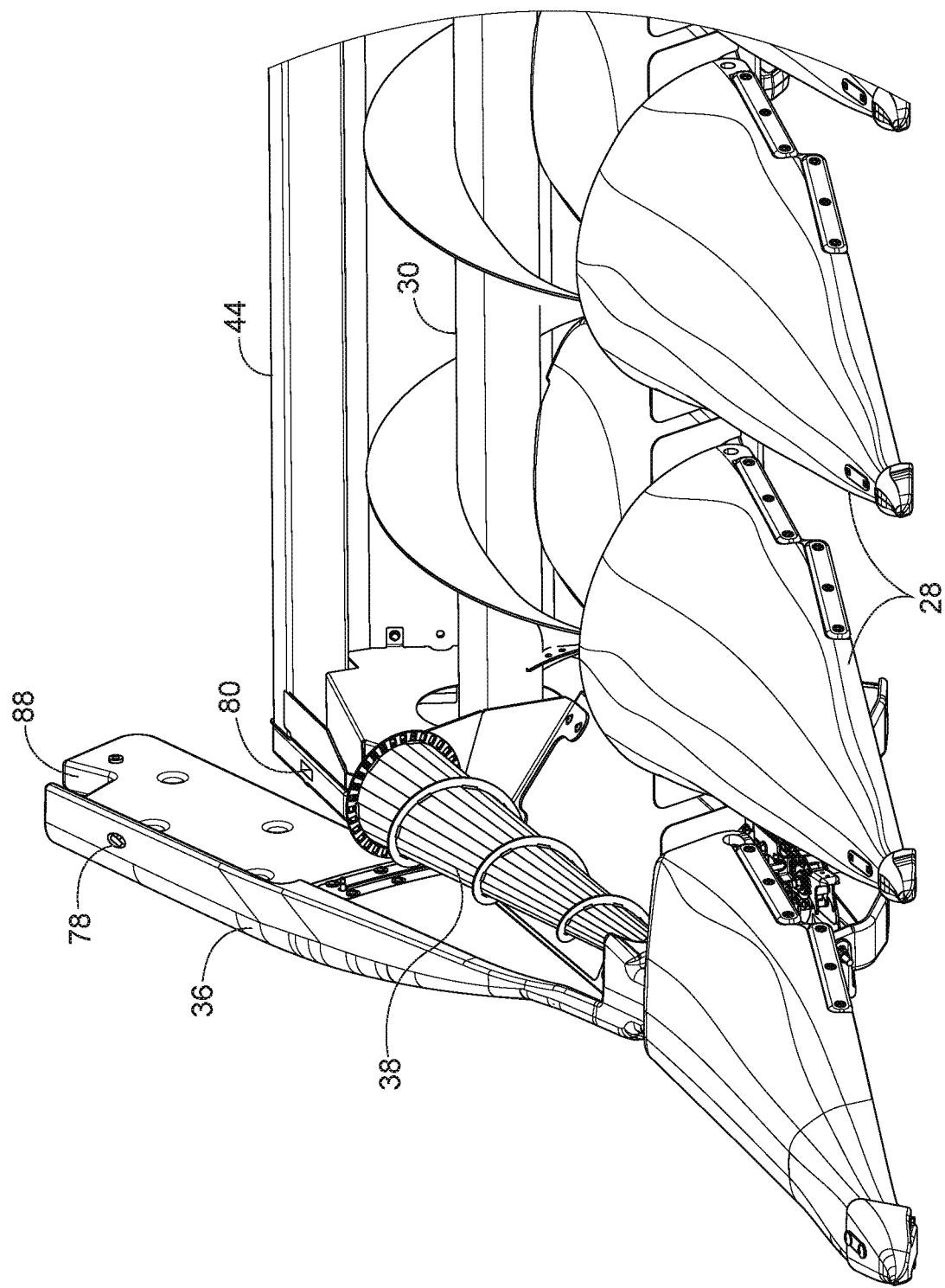
FIG. 12 is a close up perspective view of a left side portion of the corn head with the crop divider in the raised position.

As shown in FIG. 12, a second retaining element 78 is configured to retain the second crop divider 36 in the lowered position while the second retaining element 78 engages the second crop divider 36. The second side frame 44 includes a second slot 80. To retain the second crop divider 36 in the lowered position, the second retaining element 78 is inserted into the second slot 80 and rotated into a locked position. When the second retaining element 78 is in the locked position, the second crop divider 36 is retained in the lowered position. The second crop divider 36 is shown in the lowered position in FIG. 9. The second retaining element 78 can be unlocked to permit the second crop divider 36 to move with respect to the second side frame 44. FIG. 12 illustrates the second crop divider 36 in the raised position.

Figure 13:
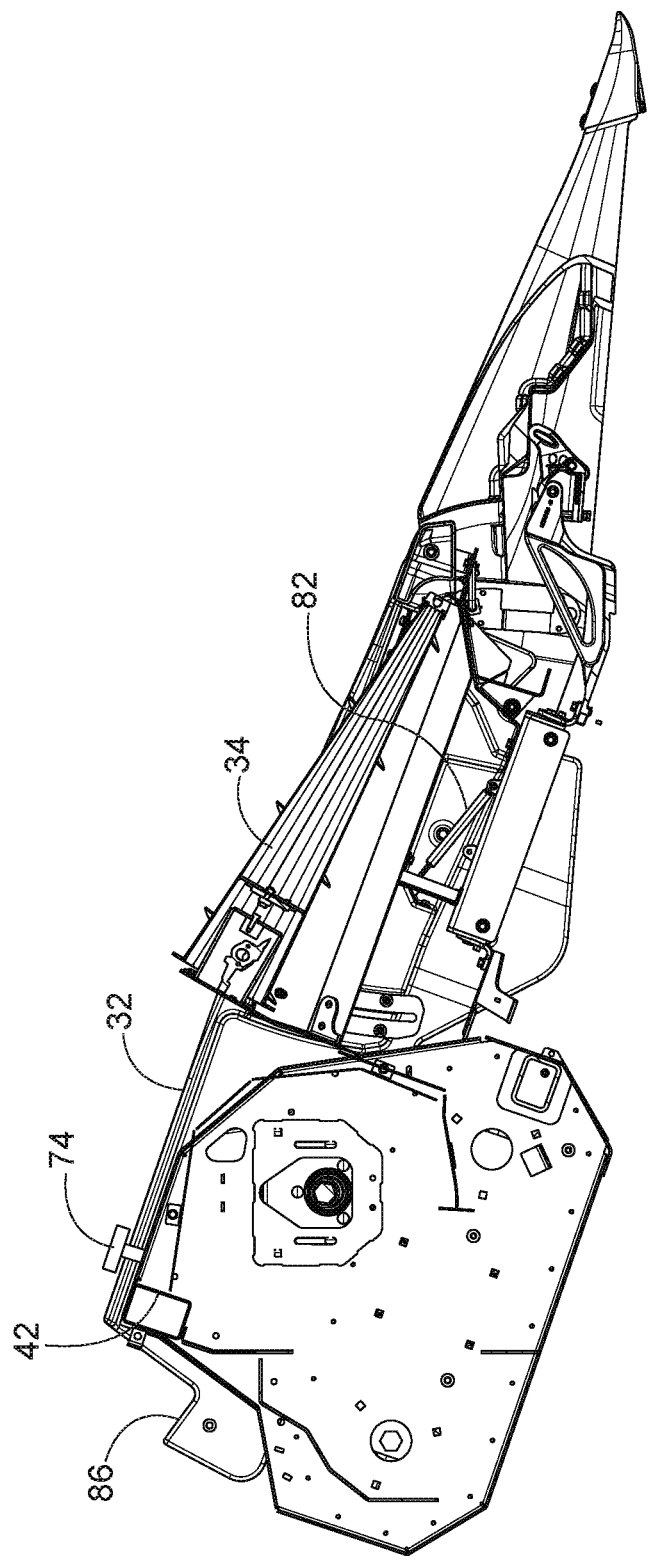
FIG. 13 is a partial side view showing an interior of the right side crop divider in a lowered position.

FIG. 13 is a side view of the first crop divider 32 and the first rotary stalk lifter 34 of FIG. 10 but with several parts removed for clarity. As shown clearly in FIG. 13, a first biasing member 82 is configured to bias the first crop divider 32 into the raised position. The first biasing member 82 includes a first end coupled to a portion of the first side frame portion 42 and a second end coupled to the first crop divider 32. The illustrated first biasing member 82 is a gas strut, but other suitable biasing members can be utilized.

With reference to FIGS. 4 and 13, the first crop divider 32 includes a first flange 86 extending rearward with respect to a direction of travel. When the first side frame portion 42 is moved into the stowed position (as shown in FIG. 3), the first flange 86 is configured to abut the main frame portion 40. When the first flange 86 abuts the main frame portion 40, the first crop divider 32 is moved into the lowered position against the biasing force of the first biasing member 82. Thus, movement of the first crop divider 32 into the lowered position when the first side frame portion 42 is rotated into the stowed position does not require any input from the operator. When the first side frame portion 42 is rotated into the deployed position (shown in FIG. 2), the first biasing member 82 moves the first crop divider 32 into the raised position unless the first retaining element 74 is in locking engagement with the first slot 76.

Figure 14:
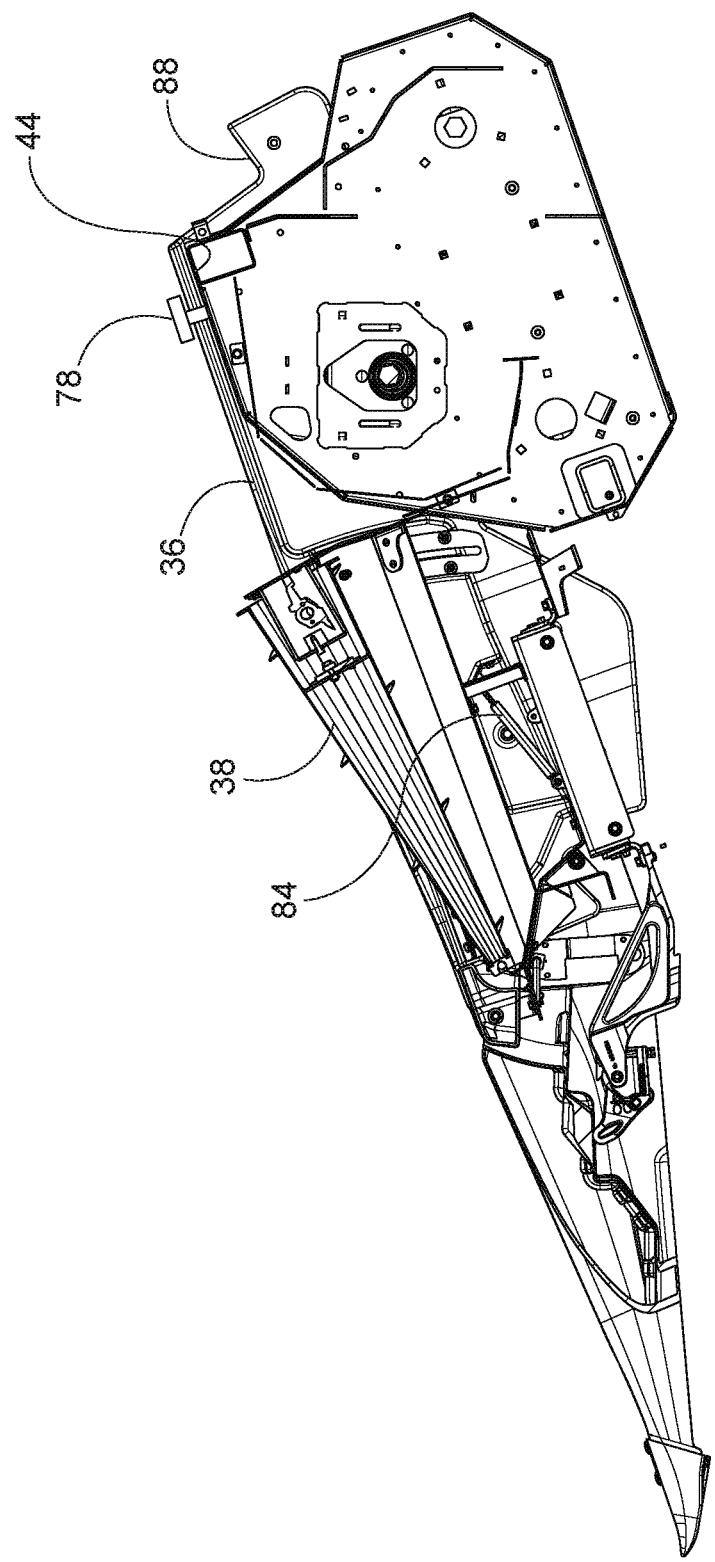
FIG. 14 is a partial side view showing an interior of the left side crop divider in a lowered position

FIG. 14 is a side view of the second crop divider 36 and the second rotary stalk lifter 38 of FIG. 12, but with the second crop divider 36 in the stowed position and with several parts removed for clarity. FIG. 14 shows a second biasing member 84 that is configured to bias the second crop divider 36 into the raised position. The second biasing member 84 includes a first end coupled to a portion of the second side frame portion 44 and a second end coupled to the second crop divider 36. The illustrated second biasing member is a gas strut, but other suitable biasing members can be utilized.

With reference to FIGS. 4 and 14, the second crop divider includes a second flange 88 extending rearward with respect to a direction of travel. When the second side frame portion 44 is moved into the stowed position (as shown in FIG. 3), the second flange 88 is configured to abut the main frame portion 40. When the second flange 88 abuts the main frame portion 40, the second crop divider 36 is moved into the lowered position against the biasing force of the second biasing member 84. Thus, movement of the second crop divider 36 into the lowered position when the second side frame portion 44 is rotated into the stowed position does not require any input from the operator. When the second side frame portion 44 is rotated into the deployed position, the second biasing member 84 moves the second crop divider 36 into the raised position unless the second retaining element 78 is in locking engagement with the second slot 80.

The operator can determine the preferred height of the first and second crop dividers 32 and 36, based upon the crop height. For example, for a relatively short crop, the operator can lock the first and second crop dividers 32 and 36 into the stowed positions with the respective retaining elements 74 and 78. If the retaining elements 74 and 78 are locked, the first and second crop dividers 32 and 36 will be retained in the lowered position when the first and second side frame portions 42 and 44 are stowed or deployed (see FIGS. 3 and 2, respectively). For a relatively tall crop, the operator can unlock the respective retaining elements 74 and 78. If the retaining elements 74 and 78 are unlocked, the first and second crop dividers 32 and 36 will be moved into the raised position by the biasing members 82 and 84 when the first and second side frame portions 42 and 44 are in the deployed position (shown in FIG. 2), and will be moved into the stowed position by the first and second flanges 86 and 88 abutting against the main frame portion 44 when the first and second side frame portions 42 and 44 are stowed (shown in FIG. 3). The operator is not required to raise and lower the first and second crop dividers 32 and 36 when the first and second side frame portions 42 and 44 are moved between the stowed and deployed positions. Rather, the first and second crop dividers 32 and 36 are moved to the raised position by the biasing members 82 and 84 when the first and second side frame portions 42 and 44 are deployed unless the retaining elements 74 and 78 are locked. Also, the first and second crop dividers 32 and 36 are moved into the lowered position by the flanges 86 and 88 abutting against the main frame portion 40 when the first and second side frame portions 42 and 44 are stowed.

Various features and advantages of the disclosure are set forth in the following claims.

The invention claimed is:

1. A harvester configured to travel along a ground surface to harvest crops, the harvester comprising:
   a main frame portion having a first main frame end and a second main frame end;
   a first side frame portion including a first end rotatably coupled to the first main frame end, and a second end spaced from the first end, the first side frame portion rotatable about the main frame between a deployed position in which the first side frame portion is positioned adjacent the ground surface and the first main frame end, and a stowed position in which the first side frame portion is positioned vertically above the first main frame and is spaced from the ground surface;

a first crop divider coupled to the second end of the first side frame portion, the first crop divider rotatable between a raised position in which the first crop divider is oriented at a first angle with respect to the ground surface while the first side frame portion is in the deployed position, and a lowered position in which the first crop divider is oriented at a second angle with respect to the ground surface while the first side frame portion is in the deployed position, the first angle being greater than the second angle;

a first biasing member configured to bias the first crop divider into the raised position;

a second side frame portion including a first end rotatably coupled to the main frame portion at the second main frame end, and a second end spaced from the first end, the second side frame rotatable about the main frame end between a deployed position in which the second side frame is positioned adjacent the ground surface and the second main frame end, and a stowed position in which the first side frame is positioned vertically above the main frame and is spaced from the ground surface;

a second crop divider coupled to the second end of the second side frame portion, the second crop divider rotatable between a raised position in which the second crop divider is oriented at a third angle with respect to the ground surface while the second side frame portion is in the deployed position and a lowered position in which the second crop divider is oriented at a fourth angle with respect to the ground surface while the second side frame portion is in the deployed position, the third angle being greater than the fourth angle; and a second biasing member configured to bias the second crop divider into the raised position, wherein during movement of the first side frame portion into the stowed position, the first crop divider is configured to be moved into the lowered position against the biasing force of the first biasing member, and wherein during movement of the second side frame portion into the stowed position, the second crop divider is moved into the lowered position against the biasing force of the second biasing member.

2. The harvester of claim 1, further comprising a first retaining element configured to retain the first crop divider in the lowered position while the first retaining element engages the first crop divider, and a second retaining element configured to retain the second crop divider in the lowered position while the second retaining element engages the second crop divider.

3. The harvester of claim 1, further comprising a hopper configured to retain harvested crop and an auger configured to rotate to move harvested crop toward the hopper.

4. The harvester of claim 3, further comprising a first rotary stalk lifter coupled to the first side frame portion adjacent to the first crop divider, the first rotary stalk lifter configured to rotate to move harvested crop toward the auger.

5. The harvester of claim 4, further comprising a second rotary stalk lifter coupled to the second side frame portion adjacent to the second crop divider, the second rotary stalk lifter configured to rotate to move harvested crop toward the auger.

6. The harvester of claim 1, wherein a portion of the first crop divider is configured to contact the main frame portion while the first side frame portion is moved into the stowed position, such that the main frame portion moves the first crop divider into the lowered position against the bias of the first biasing member.

7. The harvester of claim 6, wherein a portion of the second crop divider is configured to contact the main frame portion while the second side frame portion is moved into the stowed position, such that the main frame portion moves the second crop divider into the lowered position against the bias of the second biasing member.

8. The harvester of claim 6, wherein the first crop divider is configured to be moved to the raised position by the first biasing member and is configured to be moved to the lowered position by contact with the main frame portion, and wherein moving the first crop divider between the raised position and the lowered position does not require any input from an operator, and
wherein the second crop divider is configured to be moved to the raised position by the second biasing member and is configured to be moved to the lowered position by contact with the main frame portion, and wherein moving the second crop divider between the raised position and the lowered position does not require any input from an operator.

9. The harvester of claim 7, wherein the first rotary stalk lifter is coupled to the first crop divider such that the first rotary stalk lifter moves with the first crop divider between a lowered position and a raised position, and
wherein the second rotary stalk lifter is coupled to the second crop divider such that the second rotary stalk lifter moves with the second crop divider between a lowered position and a raised position.

10. The harvester of claim 1, wherein the first biasing member is a first gas strut having a first end coupled to the first side frame portion and a second end coupled to the first crop divider, and wherein the second biasing member is a second gas strut having a first end coupled to the second side frame portion and a second end coupled to the second crop divider.

11. A harvester comprising:
a frame configured to travel along a ground surface, the frame including a first end and a second end spaced from the first end;
at least one crop engaging implement coupled to the frame, the at least one crop engaging implement configured to harvest crops as the main frame travels along the ground surface;
a hopper coupled to the frame, the hopper configured to retain harvested crops;
a first crop divider coupled to the first end of the frame, the first crop divider moveable between a raised position in which the first crop divider is oriented at a first angle with respect to the ground surface, and a lowered position in which the first crop divider is oriented at a second angle with respect to the ground surface, the first angle being greater than the second angle;
a first biasing member configured to bias the first crop divider into the raised position;
a first rotary stalk lifter coupled to the frame adjacent the first end, the first rotary stalk lifter configured to rotate to move harvested crops toward the hopper;
a second crop divider coupled to the second end of the frame, the second crop divider moveable between a raised position in which the second crop divider is oriented at a third angle with respect to the ground surface, and a lowered position in which the second crop divider is oriented at a fourth angle with respect to the ground surface, the third angle being greater than the fourth angle;
a second biasing member configured to bias the second crop divider into the raised position; and
a second rotary stalk lifter coupled to the frame adjacent the second end, the second rotary stalk lifter configured to rotate to move harvested crops toward the hopper.

12. The harvester of claim 11, further comprising a first retaining element configured to retain the first crop divider in the lowered position while the first retaining element engages the first crop divider, and a second retaining element configured to retain the second crop divider in the lowered position while the second retaining element engages the second crop divider.

13. The harvester of claim 11, wherein the frame includes a main frame portion and a first side frame portion positioned adjacent the first end of the frame, and
wherein the first side frame portion is rotatable with respect to the main frame portion between a stowed position in which the first side frame portion is positioned above the main frame portion and a deployed position in which the first side frame portion is positioned on the ground surface adjacent to the first end of the main frame portion.

14. The harvester of claim 13, wherein the frame further includes a second frame side portion positioned adjacent the second end of the frame, and
wherein the second side frame portion is rotatable with respect to the main frame portion between a stowed position in which the second side frame portion is positioned above the main frame portion and a deployed position in which the second side frame portion is positioned on the ground surface adjacent to the second end of the main frame portion.

15. The harvester of claim 14, wherein the first crop divider and the first rotary stalk lifter are coupled to the first side frame,
wherein while the first crop divider is in the stowed position, a portion of the first rotary stalk lifter extends vertically above a portion of the first crop divider, and
wherein while the first crop divider is in the deployed position, the first crop divider extends vertically above the first rotary stalk lifter.

16. The harvester of claim 15, wherein the second crop divider and the second rotary stalk lifter are coupled to the second side frame,
wherein while the second crop divider is in the stowed position, a portion of the second rotary stalk lifter extends vertically above a portion of the second crop divider, and
wherein while the second crop divider is in the deployed position, the second crop divider extends vertically above the second rotary stalk lifter.

17. The harvester of claim 16, wherein the first crop divider is configured to be moved to the raised position by the first biasing member and is configured to be moved to the lowered position by contact with the main frame portion, and wherein moving the first crop divider between the raised position and the lowered position does not require any input from an operator.

18. The harvester of claim 17, wherein the second crop divider is configured to be moved to the raised position by the second biasing member and is configured to be moved to the lowered position by contact with the main frame portion, and wherein moving the second crop divider between the raised position and the lowered position does not require any input from an operator.

19. The harvester of claim 18, wherein the first biasing member is a first gas strut having a first end coupled to the first side frame portion and a second end coupled to the first crop divider, and wherein the second biasing member is a second gas strut having a first end coupled to the second side frame portion and a second end coupled to the second crop divider.

20. The harvester of claim 11, wherein the first rotary stalk lifter is coupled to the first crop divider such that the first rotary stalk lifter moves with the first crop divider between a lowered position and a raised position, and
wherein the second rotary stalk lifter is coupled to the second crop divider such that the second rotary stalk lifter moves with the second crop divider between a lowered position and a raised position.

* * * * *